March 7, 1939.  M. IRELAND  2,149,965

TOASTER CONTROL

Filed Jan. 13, 1938    2 Sheets-Sheet 1

Fig. 1.

Fig. 2.

Inventor:
Murray Ireland.
By H. M. Bichel
Attorney.

March 7, 1939.  M. IRELAND  2,149,965
TOASTER CONTROL
Filed Jan. 13, 1938  2 Sheets-Sheet 2
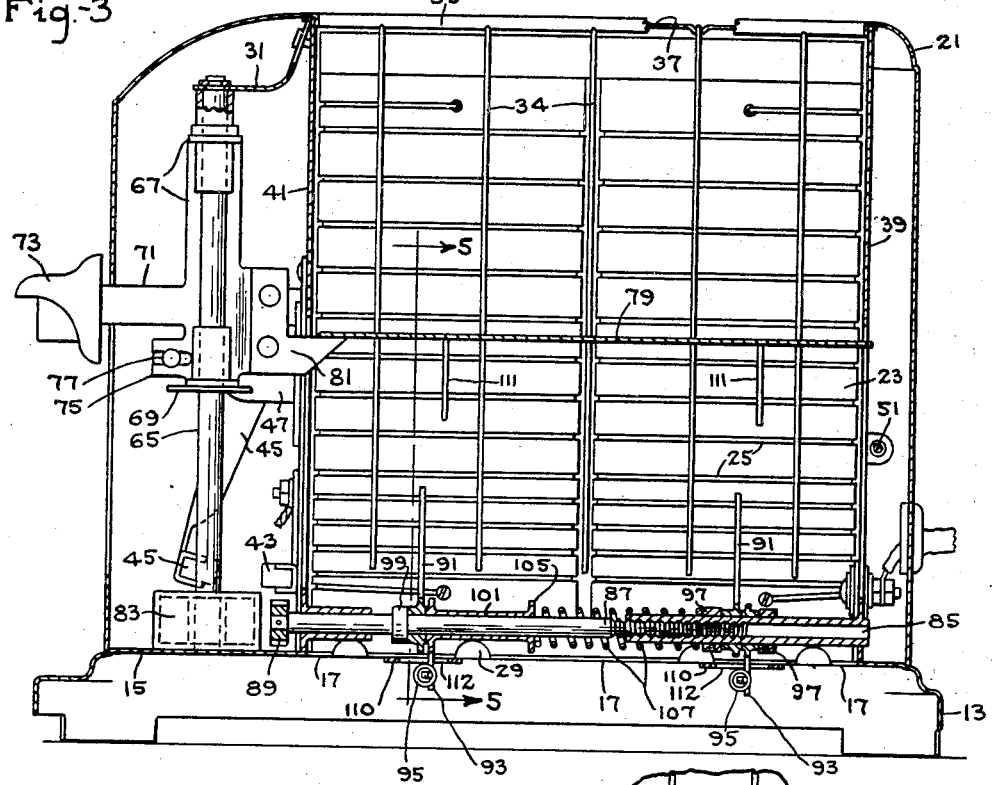
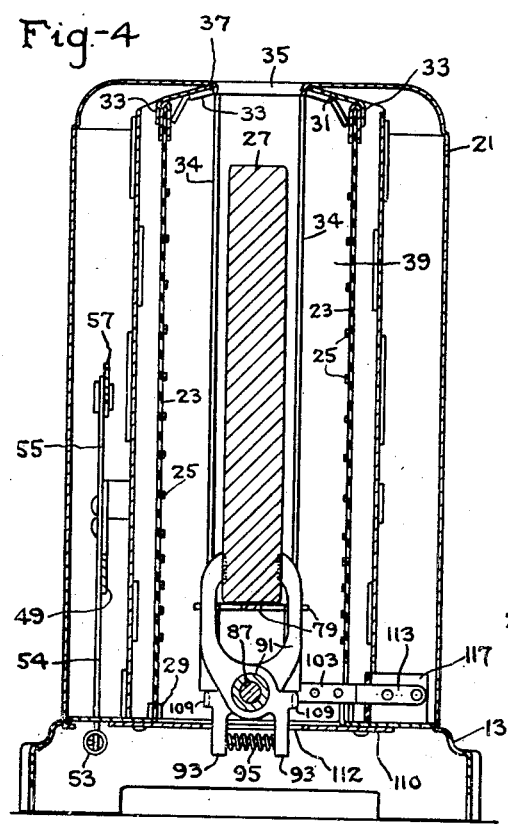
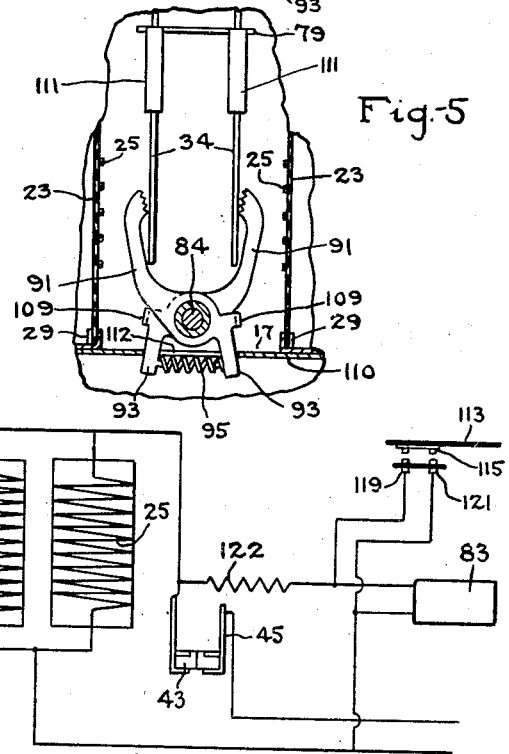
Inventor:
Murray Ireland.
By N. M. Riebel
Attorney.

Patented Mar. 7, 1939

2,149,965

UNITED STATES PATENT OFFICE 2,149,965

TOASTER CONTROL

Murray Ireland, St. Paul, Minn., assignor to McGraw Electric Company, Chicago, Ill., a corporation of Delaware Application January 13, 1938, Serial No. 184,788

9 Claims. (Cl. 219—19)

My invention relates to automatic toasters and particularly to novel means for controlling the duration of a toasting operation of a toaster.

An object of my invention is to provide a relatively simple and effective means depending on the shrinkage in a selected physical dimension of a slice of bread being toasted for terminating a toasting operation.

Another object of my invention is to provide a relatively simple means for engaging a slice of bread when placed in toasting position, effective to terminate a toasting operation when a predetermined decrease has occurred in the dimension of a slice of bread being toasted along a major axis of the bread slice.

Another object of my invention is to provide a novel method for controlling the duration of a toasting operation of a toaster that shall be independent of variations of temperature in the toaster or in the toasting chamber thereof.

Other objects of my invention will either be apparent from a description of one form of device embodying my invention or will be pointed out hereinafter either in the course of such description or in the claims.

In the drawings,

Fig. 1 is a view in vertical longitudinal section through a toaster embodying my invention, taken on the line 1—1 of Fig. 2, Fig. 2 is a view in horizontal section therethrough taken on the line 2—2 of Fig. 1, Fig. 3 is a view in vertical longitudinal section therethrough taken on the line 3—3 of Fig. 2, Fig. 4 is a view in lateral vertical section therethrough taken on the line 4—4 of Fig. 1, Fig. 5 is a fragmentary view in vertical lateral section taken on the line 5—5 of Fig. 3, and Fig. 6 is a diagram of connections of the toaster.

I have found that the degree of shrinkage of a slice of bread, such as the longitudinal shrinkage along a major axis thereof, is a measure of the degree of toasting of a slice of bread and the drawings show one form of device utilizing this discovery to determine the duration of a toasting operation. I have elected to show a mechanism for practicing such method of control as applied to a single slice toaster of a particular kind, but I do not desire to be limited thereto since the details embodying my invention can be utilized with other types of toasters.

A toaster assembly 11 comprises a base 13 which may be of any usual kind and which either has secured thereto or integral therewith a base plate 15. This base plate may be provided with a longitudinally extending aperture 17 therein for a purpose to be hereinafter mentioned.

The assembly includes further a casing 19 comprising two side walls and front and rear walls, the lower edges of these walls being suitably secured against the base plate or the base 13 in any suitable or desired manner. A cover 21 may be held in proper operative position relatively to the walls of casing 19 in any desired manner now well known in the art.

A pair of spaced heating elements are positioned in the casing and include vertically-extending plates 23 of electric-insulating material, such as mica, on which is wound in a manner now well known in the art, a resistor 25 which, as shown particularly in Figs. 3 and 4 of the drawings, may have the major portion thereof wound on one side only, namely that side facing a slice of bread 27 which is positioned between the spaced heating elements to be toasted thereby. The base plate 15 may be provided with upwardly extending integral lugs 29 which are adapted to receive and hold the lower edges of the plates 23.

A top frame plate 31 is provided at the top of the toaster assembly and has lateral depending flanges 33 thereon which cooperate with return-bent upper end portions of guard wires 34 to hold the upper edges of the respective plates 23, in a manner now well known in the art. The cover 21 is provided with an aperture 35 therein and the top frame plate 31 is provided with a registering aperture 37 therein to permit of the insertion and removal of slices of bread from toasting position between the heating elements. I provide further a rear intermediate plate 39 and a front intermediate plate 41 suitably supported on base plate 15 and extending upwardly to substantially the inner face of cover 21. The heating elements and particularly the plates 23 cooperate with the front and rear intermediate walls and parts of the base plate and the cover to constitute a toasting chamber within which slices of bread may be toasted. The openings 17, 25 and 37 mentioned above permit a through draft of cooling air to flow upwardly through the toasting chamber.

Means for controlling the energization of the heating elements includes a contact member 43 insulatedly mounted on the front intermediate wall 41 and a contact arm 45 pivotally mounted intermediate its ends on a bracket 47 which bracket is also insulatedly supported on the front intermediate wall 41. The contact arm 45 is actuated by means including a bellcrank lever 49 pivotally mounted at 51 on the rear intermediate plate 39. A coil spring 53 has one end connected to the forward portion of base plate 15 and its other end connected to a depending arm 54 of bellcrank lever 49 (see Fig. 1) to bias the bellcrank lever to its upper position or in a counter-clockwise direction as seen in Fig. 1 of the drawings.

Bellcrank lever 49 is provided with an upwardly extending short arm 55 to which is pivotally connected the rear end of a link 57 the forward end of which is provided with a longitudinal slot 59 into which there fits a pin 61 mounted on the upper end of contact arm 45. Pin 61 is connected to the forward end of link 57 by a spring 63 to constitute a resilient connection therebetween in a manner now well known in the art.

A vertical standard 65 has its lower end supported by base plate 15 in front of the front intermediate wall 41 in a chamber constituted by the front portion of the casing of the base plate and cover and the front intermediate wall, which may be called the mechanism chamber. The upper end of standard 65 may be held by a forward portion of the top frame plate 31. A slider 67 is vertically movable on this standard and has coaxially mounted thereon a circular disc 69 made of magnetizable material, for a purpose to be hereinafter set forth. The slider 67 is provided with a forwardly extending portion 71 on which is mounted a knob 73 in front of the front wall of the casing, the portion 71 being movable in a slot in the front wall of casing 19. The slider 67 is provided also with a slotted forwardly extending portion 75. A pin 77 which is fixedly mounted in the front end of bellcrank lever 49 and extending laterally thereof fits in slotted portion 75.

A bread slice support 79 is vertically movable in the toasting chamber and is supported from a rearwardly extending portion 81 of slider 67. Spring 53 is effective not only to bias contact arm 45 to open position but to bias the bread slice support 79 to its upper or non-toasting position, from which it may be moved manually or in any other manner, to its lower position, shown particularly in Fig. 4 of the drawings, which is the toasting position.

Disk 69, fixedly mounted at or near the bottom of slider 67 cooperates with an ironclad solenoid 83 secured to the top of base plate 15 in the mechanism chamber, in coaxial alinement with standard 65, to constitute means for holding the switch closed and the bread slice support in toasting position after they have been moved as hereinbefore described, that is, the electro-magnet 83 is so designed and constructed that when energized it will hold its armature 69 in the position shown particularly in Fig. 1 of the drawings, retaining it in this position until the solenoid 83 is deenergized by means to be described.

A tubular member 85 extends parallel with the top of base plate 15 and its rear end is fixedly held by any suitable means, such as the rear intermediate wall 39. The forward end of tube 85 is provided with internal screw threads shown in Fig. 3 of the drawings. A rod 87 is positioned coaxially with tubular member 85, has its rear end portion provided with external screw threads interfitting with the internal screw thread in member 85, as shown in Fig. 3 of the drawings. The forward end of rod 87 is rotatably mounted as by being extended through an opening in front intermediate wall 41 and has a pinion 89 fixedly mounted thereon in front of the front intermediate wall 41.

A pair of jaws 91 are rotatably mounted on tubular member 85 in a predetermined position thereon relatively to a slice of bread, the object being to locate these gripping jaws at or near the rear edge portion and adjacent the bottom of a slice of bread when the same is located in toasting position in the toasting chamber. The gripping jaws 91 are provided with depending projections 93 and an expansion coil spring 95 extends between these depending arms 93 to normally cause each pair of jaws to occupy the position shown particularly in Fig. 5 of the drawings. The jaws 91 on tubular member 85 may be held in the desired position longitudinally of the tubular member by collars 97 fixedly mounted on tubular member 85 in such manner that the jaws will have limited turning movement on the tubular member when desired.

A second pair of jaws 91, positioned on rod 87 are located longitudinally thereof in position to grip or clamp a slice of bread near the forward edge adjacent the bottom thereof. A short collar 99 may be fixedly mounted on rod 87 to limit forward longitudinal movement of the gripping jaws 91. A short tubular member 101 is mounted loosely on rod 87 and is provided with a lateral arm 103 for a purpose to be hereinafter set forth. The arm 103 is made wide enough where it surrounds rod 87 so that it may act as an abutment 105 (see Fig. 3) for a spring 107 coaxial with rod 87 and tube 85, spring 107 tending to bias the pairs of gripping jaws apart or away from each other. That is, spring 107 tends to move tube 101 and the pair of gripping jaws 91 against collar 99, the design, construction and location of these pairs of jaws being such, as has already been set forth hereinbefore, that when the jaws are caused to engage a slice of bread the respective pairs will engage it at or near the rear and the front edges thereof. The forward pair of gripping jaws is substantially the same as is the rear pair.

The depending extensions 93 of the gripping jaws are further provided with lateral lugs 109, which lugs are adapted to be engaged by depending arms 111 on bread slice support 79. As is evident from Fig. 5 of the drawings, depending arms 111 on bread slice support 79 are located well above the jaws 91 when the bread slice support is in non-toasting position, but when the bread slice support is moved downwardly as by an operator pressing on knob 73, the lower end of the arms 111 will engage the upper faces of lugs 109 causing turning movement of the respective jaws so that their upper ends will move toward each other to thereby engage with a slice of bread.

Means to hold the respective pairs of jaws 91 in the desired upright position when not in engagement with a slice of bread, may include a plate 110, secured to base plate 15 against its lower surface. Each plate 110 is provided with a slot 112, through which the depending projections 93 extend. The end walls of the slot 112 limit the spreading action of the springs 95 on the projections 93, so that each pair of jaws 91 will normally be in the positions shown in Fig. 5. They will occupy the positions shown in Fig. 4, when in engaging relation with a slice of bread being toasted.

Arm 103 may have mounted thereon and extending away therefrom a bar 113 of electric-insulating material on which there is mounted a contact bridging member 115. A bracket 117, which may, for instance, be of electric-insulating material, is secured to base plate 15 and has mounted thereon two contact members 119 and 121. It is obvious of course that I could use a metal bracket and mount the contact members 119 and 121 thereon and insulate them therefrom in a manner well known in the art.

Reference to Fig. 6 of the drawings will show that movable contact arm 45 cooperates with fixed contact member 43 to control the energization of the heating elements including the resistors 25 as well as controlling the energization of solenoid 83, and it will be noted from this diagram of connections that solenoid 83 will be energized as long as contact bridging member 115 is out of engagement with contact members 119 and 121. A current limiting resistance 122 may be provided to keep the current in this control circuit within reasonable limits when the solenoid 83 is short circuited, as is well known in the art. This resistor may be supported within base 13. I desire it to be understood that I may interrupt the circuit of electromagnet 83, instead of short circuiting its coil, to effect deenergization of the electromagnetic detent.

Let it be assumed that an operator has placed a slice of bread on support 79 when the latter is in its position as shown in Fig. 3 of the drawings, and has depressed knob 73. Bread slice support 79 is moved downwardly into toasting position, and contact arm 45 is moved into engagement with fixed contact 43 whereby the circuits shown in Fig. 6 are energized. Depending arms 111 engage with lugs 109 to cause breadgripping movement of the jaws at or near the end of the downward movement of the bread slice support. The energized heating elements will heat up and cause toasting of the slice of bread and the latter will shrink. I have found, for instance, that in a certain kind of bread, a slice of which may be on the order of four and one-half inches long, will shrink on the order of one-fourth inch when the slice of bread has been toasted to an ordinary degree of brownness.

It is obvious that the rear pair of gripping jaws are held stationary because of their mounting, while the forward pair of jaws 91 will be moved, by the shrinking bread slice, toward the rear jaws, thereby causing movement of arm 103, bar 113 and bridging member 115, the desired adjustment of the above described mechanism being such that when the desired degree of toasting has been effected bridging member 115 will engage contacts 119 and 121 thereby to deenergize solenoid 83. Disc 69 will therefore be released and spring 53 then becomes effective to raise the bread slice support quickly into non-toasting position and to simultaneously open the control switch for the heating elements. Upward movement of the bread slice support permits opening movement of the pairs of jaws 91 and spring 107 causes movement of the front pair of jaws 91 away from the rear pair of jaws and simultaneous movement of contact bridging member 115 out of engagement with contacts 119 and 121. The toaster is then ready for another operation.

It is obvious that my invention, while described as used with electric heating means, is not limited thereto and further that while I have illustrated and described an electro-magnetic latch or detent my invention is not limited thereto and that I may use any form of mechanical detent effective for the same purpose.

It is of course highly desirable to provide means for varying the degree of toasting at which a toasting operation will be terminated and for this purpose I may provide a gear 123 (see Fig. 2) fixedly mounted on a shaft 125. This shaft is located in suitable bearings, extends through the front wall of casing 19 and has a knob 127 mounted thereon outside of the casing. Gear 123 meshes with pinion 89, this construction permitting of causing turning movement of rod 87 in its cooperating tubular member 85 whereby to vary the initial distance between contact bridging member 115 and the fixedly mounted contacts 119 and 121.

I desire it further to be understood that while I have shown bread gripping means, that is, jaws engaging with a lateral or with lateral surfaces of a slice of bread being toasted, I do not consider my invention limited to such shrinkage measuring means. I may employ arms merely engaging the front and the rear edges of a slice of bread, one arm being substantially fixed relatively to the toaster structure while the other arm may follow the shrinkage of a slice of bread being toasted in substantially the same manner and being made effective for the same purpose as are the gripping jaws in the present embodiment of my invention.

The device embodying my invention is thus a relatively simple one utilizing a relatively small number of easily operable parts and it may be particularly pointed out that no means to compensate for different toaster temperatures is required as is now the case with certain automatic toasters. The length of time of the first toasting operation, that is when starting with a cold toaster, will be much longer than subsequent operations but since the variation in the distance between the two elements engaging a slice of bread or the shrinkage of the bread between two spaced points thereon is measured and utilized to control the duration of the toasting operation, it is obvious that a toasting operation is terminated when the variation in the distance or the shrinkage between two points along a major axis of a slice of bread has reached a certain value and is therefore independent of toaster temperature and dependent only on the degree of toasting, since shrinkage is a direct measure of the degree of toasting of a slice of bread. A device embodying my invention permits also of utilizing a novel method of controlling a toasting operation or of controlling the duration of successive toasting operations, in a very simple and highly efficient manner as has already been set forth.

Various modifications may be made in the device embodying my invention without departing from the spirit and scope thereof and I desire therefore that only such limitations shall be imposed as are necessary because of the prior art or are set forth in the appended claims.

I claim as my invention:

1. In an automatic toaster, the combination with a heating means for toasting a slice of bread and means for initiating a toasting operation, of means for terminating a toasting operation, said terminating means including a pair of spaced jaw members movable to grip a slice of bread at spaced points thereon when it is placed in toasting position in a toaster and means to effect deenergization of said heating means when said gripping members have been moved a predetermined distance nearer to each other by a slice of bread during a toasting operation.

2. In an automatic toaster, the combination with an electric heater, a control switch therefor biased to open position and movable into closed position and a latch for holding it in closed position, of relatively movable spaced bread-gripping means movable into engagement with a slice of bread simultaneously with movement of the switch to closed position and latch release means controlled by said bread-gripping means and energized to cause release of the latch when said bread-gripping means have been moved a predetermined amount closer to each other by shrinkage of the slice of bread being toasted.

3. In an automatic toaster, the combination with an electric heater, a control switch therefor biased to open position, means to move it into closed position and a latch means to hold it in closed position, of spaced pairs of bread-gripping jaws normally biased to bread-disengaging position, means actuable by said switch moving means to cause said jaws to grip a slice of bread simultaneously with the closing of said switch and latch-release means controllable by said pairs of jaws and effective to cause release of the latch when said pairs of jaws have been moved a predetermined distance nearer to each other by shrinkage of a slice of bread engaged thereby.

4. In an automatic toaster, the combination with an electric heater, a control switch therefor, a bread slice support movable into toasting and non-toasting position relatively to said heater, means normally biasing the switch to open position and the bread slice support to non-toasting position, means to move the bread support to toasting position and the switch to closed position and a latch means for holding said switch in closed position and the bread support in toasting position, of a substantially fixed plural-jaw member adapted to grip a slice of bread at one point thereof, a relatively movable plural-jaw member spaced from said substantially fixed member adapted to grip a slice of bread at another point thereon, means on said bread slice support to engage said plural-jaw members and cause them to grip a slice of bread when it is moved into toasting position, and latch-releasing means controlled by movement of said relatively movable member and effective to cause release of said latch upon predetermined movement of said relatively movable member because of shrinkage of said slice of bread along one dimension thereof.

5. In an automatic toaster, the combination with an electric heater, a bread slice support movable into toasting and non-toasting positions relatively to said electric heater, means to bias said bread support to non-toasting position, means to move the bread support to toasting position and latch means for holding it in toasting position, of spaced pairs of jaws for engaging with a slice of bread at spaced points thereon, springs normally biasing said pairs of jaws apart, means actuable by said bread support when moved into toasting position for moving said pairs of jaws into engagement with a slice of bread resting on said support, one of said pairs of jaws being effective to move toward the other pair upon shrinkage of a slice of bread being toasted and latch-releasing means actuable by said movable pair of jaws when it has been moved through a predetermined distance.

6. In an automatic toaster, the combination with a toaster structure, an electric heater, a bread slice support movable into toasting and non-toasting positions relatively to said heater and biased to non-toasting position, means to move the bread support to toasting position and latch means to hold the bread support in toasting position, of a tubular member held in substantially fixed position by said toaster structure, a rod extending coaxially with said tubular member with one end of the rod having screw threaded engagement with one end of the tubular member, a pair of bread-gripping jaws normally biased to non-bread-engaging position mounted in substantially fixed position on said tubular member, a second pair of bread-gripping jaws normally biased to non-bread-engaging position, spaced from said first mentioned pair of jaws and movably mounted on said rod, means to yieldingly bias said pairs of jaws apart, means on said bread slice support for operatively engaging said pairs of jaws when moved into toasting position to cause said pair of jaws to grip a slice of bread to be toasted at spaced points thereof and means controlled by said movably mounted pair of jaws to cause release of said latch on predetermined amount of movement thereof because of shrinkage of a slice of bread being toasted.

7. A toaster as set forth in claim 6 in which the biasing means for the bread-gripping jaws cooperate with a part of the toaster structure to hold the pairs of bread-gripping jaws in proper bread-receiving position during intervals between toasting operations.

8. A toaster as set forth in claim 6 and including means to cause turning movement of said rod relatively to said tube to vary the initial distance between said pairs of jaws to thereby vary the amount of shrinkage of a slice of bread being toasted necessary to cause energization of said latch release means.

9. A toaster as set forth in claim 6 in which the latch means includes an electromagnet for holding the latch in operative position and the movable pair of jaws are effective to cause deenergization of the electromagnet and release of the latch upon predetermined movement thereof because of shrinkage of a piece of bread being toasted.

MURRAY IRELAND.